United States Patent
Duff et al.

(10) Patent No.: US 8,247,097 B1
(45) Date of Patent: Aug. 21, 2012

(54) METHOD OF CONTROLLING BATTERY PACK HUMIDITY UTILIZING AN ACTIVE REACTIVATION SYSTEM

(75) Inventors: David Gordon Duff, Portola Valley, CA (US); Jeffrey C. Weintraub, San Carlos, CA (US); Gregory Arcenio, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/360,685

(22) Filed: Jan. 28, 2012

Related U.S. Application Data (63) Continuation of application No. 13/360,678, filed on Jan. 28, 2012.

(60) Provisional application No. 61/495,713, filed on Jun. 10, 2011.

(51) Int. Cl.
*H01M 10/44* (2006.01)
*H01M 2/00* (2006.01)

(52) U.S. Cl. .......................................... 429/50; 429/61
(58) Field of Classification Search ............... 429/50
See application file for complete search history.

(56) References Cited

U.S. PATENT DOCUMENTS

| | | |
|---|---|---|
| 2,094,329 A | 9/1937 | Mascuch |
| 3,166,446 A | 1/1965 | Hutchison |
| 3,201,284 A | 8/1965 | Ellis |
| 3,834,945 A | 9/1974 | Jensen |
| 7,326,492 B2 | 2/2008 | Abe et al. |
| 2003/0070706 A1 | 4/2003 | Fujioka |
| 2005/0029986 A1 | 2/2005 | Morgan |
| 2005/0119794 A1* | 6/2005 | Amundson et al. ........... 700/276 |
| 2008/0050645 A1 | 2/2008 | Kai et al. |
| 2010/0136402 A1* | 6/2010 | Hermann et al. .............. 429/120 |
| 2010/0275775 A1* | 11/2010 | Griffiths et al. .................... 95/18 |
| 2011/0271548 A1* | 11/2011 | Park et al. ......................... 34/475 |

FOREIGN PATENT DOCUMENTS

| | | |
|---|---|---|
| JP | 11/340494 | 12/1999 |
| JP | 2004039358 A | 2/2004 |

OTHER PUBLICATIONS

Machine Translation of JP 2004039358 A, Abe et al., Feb. 5, 2004.
Machine Translation of JP 11/340494 A, Hibino et al., Dec. 1999.
Abstract of JP 11/340494 A, Hibino et al., Dec. 1999.

\* cited by examiner

*Primary Examiner* — Patrick Ryan
*Assistant Examiner* — Muhammad Siddiquee
(74) *Attorney, Agent, or Firm* — Patent Law Office of David G. Beck (57) ABSTRACT

A method for controlling the relative humidity within a battery pack enclosure is provided in which the volume of air within the battery pack is exposed to a volume of desiccant contained within a desiccant enclosure. The system is configured to heat and reactivate the desiccant at predetermined time intervals or when the humidity within the system reaches a preset level, thereby allowing the desiccant to regain its potential for absorbing/adsorbing water vapor.

20 Claims, 12 Drawing Sheets

METHOD OF CONTROLLING BATTERY PACK HUMIDITY UTILIZING AN ACTIVE REACTIVATION SYSTEM

CROSS-REFERENCE TO RELATED APPLICATION

This application is a continuation of U.S. patent application Ser. No. 13/360,678, filed 28 Jan. 2012, and claims benefit of the filing date of U.S. Provisional Patent Application Ser. No. 61/495,713, filed 10 Jun. 2011, the disclosures of which are incorporated herein by reference for any and all purposes.

FIELD OF THE INVENTION

The present invention relates generally to battery cells and, more particularly, to a system for extending the life of the cells within a battery pack by controlling the humidity within the pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries provide a much longer service life than disposable batteries, their service life is not unlimited. There are a number of factors that limit battery service life, including; (i) the number of recharging cycles the battery has been subjected to, (ii) the rate of charging (i.e., slow trickle charge versus fast charge), (iii) the level of charging (i.e., 75% of full charge, full charge, over-charged, etc.), (iv) the level of discharge prior to charging (i.e., completely depleted, still charged to a low level, etc.), (v) the storage temperature of the battery during non-use, and (vi) the temperature of the battery during use. Additionally, battery internal mechanical and chemical instability can adversely affect battery service life.

In general, the battery chemistries used in secondary cells are less stable than those used in primary cells. As a result, secondary cells often require special handling during fabrication. For example, lithium-ion batteries are typically manufactured in humidity-controlled, dry rooms and sealed to minimize subsequent water contamination. Batteries may also be manufactured in an inert atmosphere, thereby preventing cell contamination from any of a variety of reactant gases.

Batteries are sealed to prevent leakage and/or contamination from water, oxygen, carbon dioxide, or other materials. Unfortunately, battery seals are imperfect, thereby allowing gradual contamination and degradation of the batteries. One approach to overcoming this problem is to improve the battery seals. For example, U.S. Patent Application Publication No. 2003/0096162 discloses a hermetic seal that is compatible with corrosive electrolytes such as the lithium-ion electrolyte used in a lithium cell. Although improved battery seals offer one approach to overcoming contamination issues, this approach typically requires different solutions depending upon the cell chemistry and geometry in question.

Another approach to preventing cell contamination from water is to control the relative humidity within the battery pack itself, for example using passive desiccant bags. This approach is described in co-pending U.S. patent application Ser. No. 12/386,684. Unfortunately, as sources of moisture production within the battery pack persist throughout the life of the pack, these types of passive desiccant bags eventually reach a saturation point at which point they can no longer absorb additional moisture. As a result, once saturation is reached, the desiccant bags must be replaced or the relative humidity within the pack will rise to a level that may result in dewing events. Desiccant bag replacement introduces undesirable service intervals throughout the life of the battery pack in order to replace the bags as they become saturated.

Accordingly, what is needed is a maintenance-free solution to battery pack humidity control which is operable throughout the service life of the battery pack. The present invention provides such a system.

SUMMARY OF THE INVENTION

A method of controlling battery pack humidity is provided, the method comprising the steps of (i) providing a first air passageway between the battery pack enclosure and a desiccant enclosure, the desiccant enclosure containing a volume of desiccant; (ii) removing water vapor from the battery pack enclosure, whereby the water vapor is absorbed and adsorbed by the desiccant; (iii) determining if the desiccant has lost absorption/adsorption efficacy; (iv) outputting a first heater control signal with it is determined that the desiccant has lost absorption/adsorption efficacy; (v) heating the desiccant in situ in order to reactivate the desiccant; (vi) outputting a second heater control signal after a preset period of time has passed since initiation of desiccant heating; and (vii) terminating heating.

The method may include the step of actively circulating air between the battery pack enclosure and the desiccant enclosure while performing the steps of removing water vapor from the battery pack and absorbing/adsorbing the water vapor in the desiccant. The method may include the step of providing a second air passageway between the desiccant enclosure and a volume of air external to the battery pack enclosure and the desiccant enclosure, whereby the first air passageway is closed and the second air passageway is opened after receipt of the first heater control signal, and the first air passageway is opened and the second air passageway is closed after receipt of the second heater control signal. The step of opening the second air passageway may be delayed for a predetermined period of time after receipt of the first heater control signal. The method may include the step of actively circulating air through the second passageway and between the desiccant enclosure and the external volume of air while performing the steps of heating and reactivating the desiccant.

The method may include the steps of determining elapsed time since receipt of a system initialization signal, comparing the elapsed time to a preset time period, and outputting the first heater control signal when the elapsed time exceeds the preset time period. The system initialization signal may be updated, i.e., a new initialization signal may be recorded, after the system outputs the first heater control signal; alternately, after the system outputs the second heater control signal. The method may include the steps of monitoring humidity (e.g., within the battery pack enclosure or within the desiccant enclosure), comparing the humidity to a preset humidity level, and outputting the first heater control signal when the humidity exceeds the preset humidity level.

The method may include the steps of determining if the electric vehicle containing the battery pack is in-service or out-of-service and performing the step of heating the desiccant if the vehicle is out-of-service. If the vehicle is in-service, the step of heating the desiccant may be delayed until the next time that the vehicle enters an out-of-service state. Out-of-service may correspond to the vehicle being parked; alternately, out-of-service may correspond to the battery pack being coupled to a charging system and charging source; alternately, out-of-service may correspond to the time of day being within a preset time range.

The step of heating the desiccant may further comprise the steps of activating a heating element located in a heating chamber within the desiccant enclosure and circulating air between the heating chamber and the desiccant chamber; alternately, may comprise the steps of positioning a plurality of thermally conductive structures within the desiccant and throughout the desiccant chamber and heating the thermally conductive structures with a heating element; alternately, may comprise the steps of activating a heating element within the desiccant; alternately, may comprise the steps of activating a heating element located in a heating chamber separate and remote from the desiccant enclosure and circulating heated air from the heating chamber through the desiccant enclosure.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
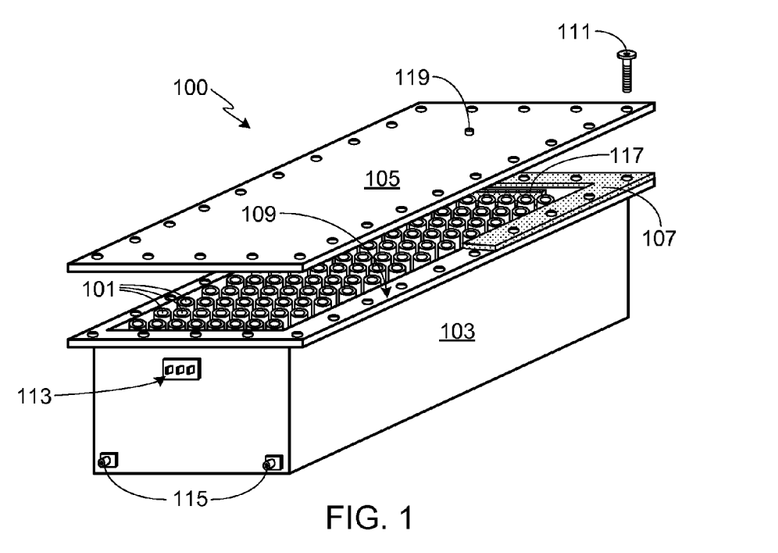
FIG. 1 is a perspective view of a preferred embodiment of a battery pack enclosure.

FIG. 1 is a perspective view of an exemplary battery pack 100 that may be used with the invention. As shown, a plurality of individual batteries 101 is mounted within a multi-piece enclosure that is comprised of a lower housing member 103 and an upper housing member 105. As the invention is not limited to a particular number of cells, a specific battery chemistry or style, or a particular interconnect configuration, further battery pack details in this regard are not provided herein.

In order to minimize battery and interconnect particulate and non-particulate (e.g., vapor) contamination, lower housing member 103 and upper housing member 105 are each fabricated from a material or materials that are impermeable to water and water vapor, and preferably impermeable in general to other liquids and gases. Additionally, as the housing members are intended to contain a plurality of cells, in some instances hundreds or thousands of cells, the housing members are fabricated from materials capable of handling the weight of the cells for the intended application. For example, one or both housing members 103/105 may be fabricated from a metal (e.g., aluminum, an aluminum alloy, steel, etc.) or from a plastic or a high strength, lightweight composite such as a carbon composite. In some instances it may be necessary to coat the material comprising the housing with an impermeable layer, e.g., a metal layer deposited on a plastic housing structure. Such an impermeable layer may be added using any of a variety of well-known coating techniques such as vapor deposition. The use of an additional impermeable coating allows the selection of the material used for the housing members to be based on the material's mechanical and electrical properties (e.g., high strength, low weight, high structural rigidity, electrically non-conductive, etc.), rather than its liquid and gas impermeability.

In order to achieve the desired enclosure impermeability, a compressible and impermeable seal 107, also referred to herein as a sealing gasket, is interposed between the complimentary and mating surfaces of lower housing member 103 and upper housing member 105. A portion of sealing gasket 107 is shown in FIG. 1. Those of skill in the art will recognize that there are countless materials from which seal 107 can be fabricated, exemplary materials including, but not limited to, polyurethanes, polychloroprenes, rubber-edged composite materials, coated (e.g., PVC coated) polymers, uncoated polymers, synthetic rubbers (e.g., butyl rubber), and acrylic impregnated polyurethanes.

In the exemplary battery pack 100, sealing gasket 107 is positioned between flange 109 of lower housing member 103 and a surface of the flat, upper housing member 105. In configurations utilizing a non-flat upper housing member, the upper housing member includes a flange that is complimentary to flange 109. Note that gasket 107 may be flat as shown, or utilize an alternate configuration (e.g., a circular cross-section prior to compression). Battery pack 100 includes means, for example a plurality of bolts 111, for compressing seal 107 and holding together the housing members. Bolts 111 may also be used to attach enclosure 100 to the mounting structure of the intended application, for example to the mounting bay of an electric vehicle.

In order to protect cells 101 from environmentally induced degradation, all connections to the internal volume of enclosure 100 are preferably hermetically sealed. Thus in exemplary battery pack 100, electrical connections 113 are hermitically sealed to lower housing member 103 as are the coolant lines/connections 115 used to couple an active cooling system to the battery pack.

Although battery pack 100 is designed to prevent the intrusion of water vapor, thereby protecting cells 101, it will be appreciated that during the lifetime of a battery pack the batteries may still be subjected to an undesirable and potentially harmful amount of water vapor, for example due to gasket leakage, hermetic seal leakage, coolant system leakage, and the out-gassing of the various materials used for the cells, cell interconnects, cooling system, and internally packaged electronics. Accordingly, battery pack 100 includes means to remove water vapor from within the pack enclosure.

Although a variety of different techniques may be used to collect and remove water vapor from the battery pack, in accordance with the invention a desiccant is used to remove water vapor from within enclosure 100 via absorption and/or adsorption. In battery pack 100, the desiccant is held within a container 117 mounted within the enclosure. The battery pack may also include a pressure management system that insures that the pressure differential between the inner volume of the enclosure and the outside environment stays within a predetermined range. In pack 100, a pressure management system is included that is comprised of one or more pressure relief valves 119, valves 119 preferably being two-way valves. Pressure relief valve(s) 119 ensures that the pressure differential between the inner enclosure volume and the outside environment does not become large enough to cause structural damage to the enclosure. Pressure differentials may be caused by the battery pack being moved to a different altitude and thus subjected to a different external pressure, or may arise due to component out-gassing, battery cell venting, temperature changes, etc. In order to minimize the risk of water vapor entering into the enclosure via the relief valve, the valve has preset relief points (i.e., set points). The pressure relief set point may be different depending upon the direction of release, i.e., inward versus outward venting, or may utilize the same set point. A typical pressure relief set point is 1 psi in either direction.

Figure 2:
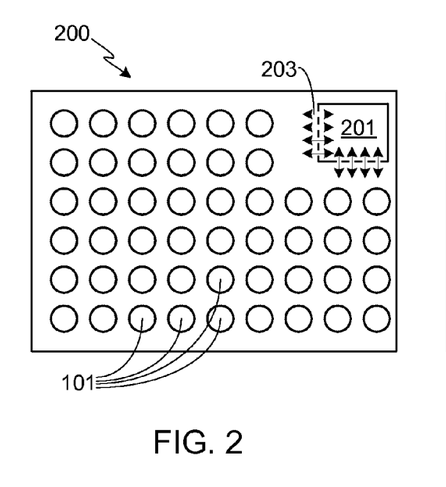
FIG. 2 provides a schematic illustration of a passive battery pack dehumidifier in which the desiccant is mounted within the pack enclosure.
Figure 3:
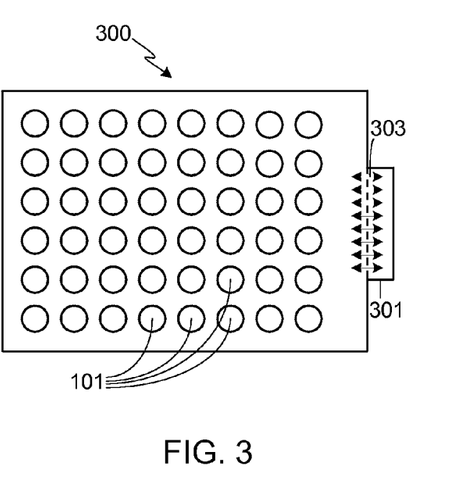
FIG. 3 provides a schematic illustration of a passive battery pack dehumidifier in which the desiccant is mounted outside of the pack enclosure.

It will be appreciated that there are a variety of ways that the system may be configured in order to expose the environment within the battery pack, and thus the cells within the battery pack, to the desiccant. For example, FIGS. 2 and 3 illustrate two passive configurations in which air from the battery pack is allowed to flow through the desiccant. In system 200 the desiccant container 201 is mounted within the battery pack and airflow, represented by arrows 203, is allowed to flow through one or more desiccant container apertures (e.g., holes, slits, etc.). In the alternate configuration shown in FIG. 3, the desiccant container 301 is mounted outside of the battery pack 300, but coupled to the battery pack such that air flow 303 is still allowed to flow freely between the battery pack and the desiccant contained within the desiccant container. It will be appreciated that desiccant container 301 may be mounted remotely from the battery pack with air flowing between the two via one or more air passageways/conduits.

Figure 4:
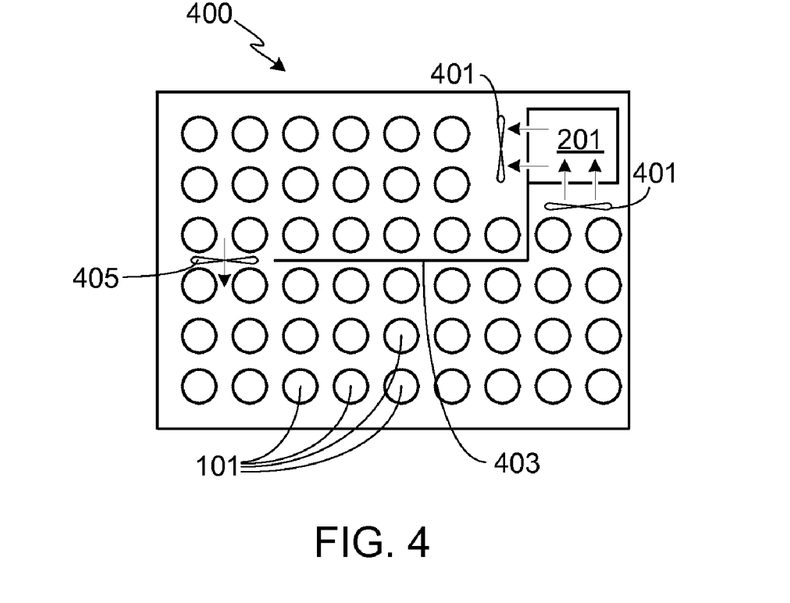
FIG. 4 provides a schematic illustration of an active battery pack dehumidifier based on the configuration shown in FIG. 2.
Figure 5:
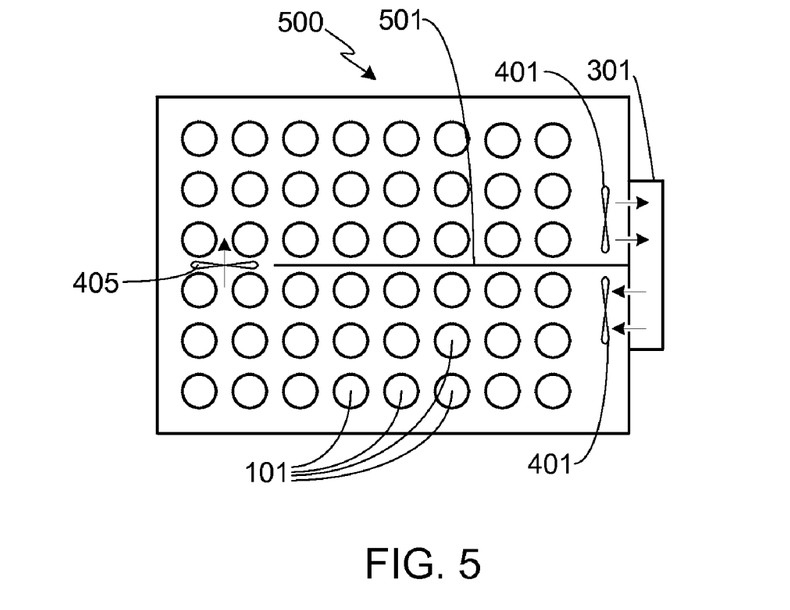
FIG. 5 provides a schematic illustration of an active battery pack dehumidifier based on the configuration shown in FIG. 3.

While the design of a dehumidifier for a relatively small volume of air, i.e., a small battery pack, is straightforward, controlling the humidity within a large battery pack is much more challenging. Assuming the use of a passive system, preferably multiple containers of desiccant are spread throughout the battery pack, if internally mounted, or coupled to multiple regions of the battery pack, if externally mounted, thus assuring adequate exposure of the entire volume of air within the pack to desiccant. Alternately, or in addition to the use of multiple containers of desiccant, an active humidity control system may be used. FIGS. 4 and 5 illustrate the two basic configurations for an active control system based on the passive systems shown in FIGS. 2 and 3, respectively. As illustrated, one or more fans 401 are used to withdraw air from the battery pack and force it through the desiccant. Circulating the air through the battery pack and through the desiccant improves performance of the dehumidifier system. Active air circulation also makes it easier to utilize a remote desiccant container that is coupled to the battery pack via conduits. Depending upon the volume of air within the battery pack as well as the overall size of the pack, further improvements in air circulation may be achieved by utilizing internal battery pack walls that help to force the circulating air to pass around all of the cells. For example, battery pack 400 includes internal wall 403 and battery pack 500 includes internal wall 501. In some configurations auxiliary circulatory fans, e.g., fans 405, located within the pack are used to further enhance air circulation. It should be understood that even with an active desiccant-based dehumidifier system, multiple desiccant containers may be required, depending upon the volume of air within the pack, the dimensions and configuration of the pack, and the amount and type of desiccant per container.

As noted above, the purpose of the desiccant-based dehumidifier system, regardless of whether the system is an active or a passive system, is to remove moisture, i.e., water vapor, from the volume of air within the battery pack. To accomplish this task one or more venting pathways are provided between the volume of desiccant and the internal battery pack air. The amount of water vapor that is removed from the air within the pack, as well as the efficiency of this process, depends on a variety of factors including the type and volume of desiccant used, the surface area of the exposed desiccant, the relative saturation level of the desiccant, the temperature of both the air within the pack and the desiccant, and lastly the relative humidity of the battery pack air.

In order to insure that the desiccant-based dehumidifier is able to continue to be effective throughout the lifetime of the battery pack, the desiccant must be replaced whenever it becomes too saturated to efficiently remove water vapor from the pack. While desiccant replacement is a viable approach to maintaining an effective dehumidifier, such an approach is undesirable for many applications, such as an electric vehicle, due to the potential difficulty of removing a large battery pack from the vehicle and replacing the pack's desiccant as well as the desire to minimize owner inconvenience. Accordingly, the present invention eliminates the need for desiccant replacement by providing a means for reconditioning the desiccant.

Desiccant reconditioning, also referred to herein as desiccant reactivation, is accomplished by drying out the desiccant through the application of heat and providing means for eliminating the collected water vapor from the system, thereby allowing the desiccant to regain its capacity for water vapor absorption/adsorption. In order to prevent recontamination of the battery pack with water vapor, during desiccant heating the airflow pathways between the desiccant and the battery pack are preferably closed, thus insuring that the air that becomes saturated with the water vapor being driven from the desiccant is expelled outside of the battery pack.

Figure 6:
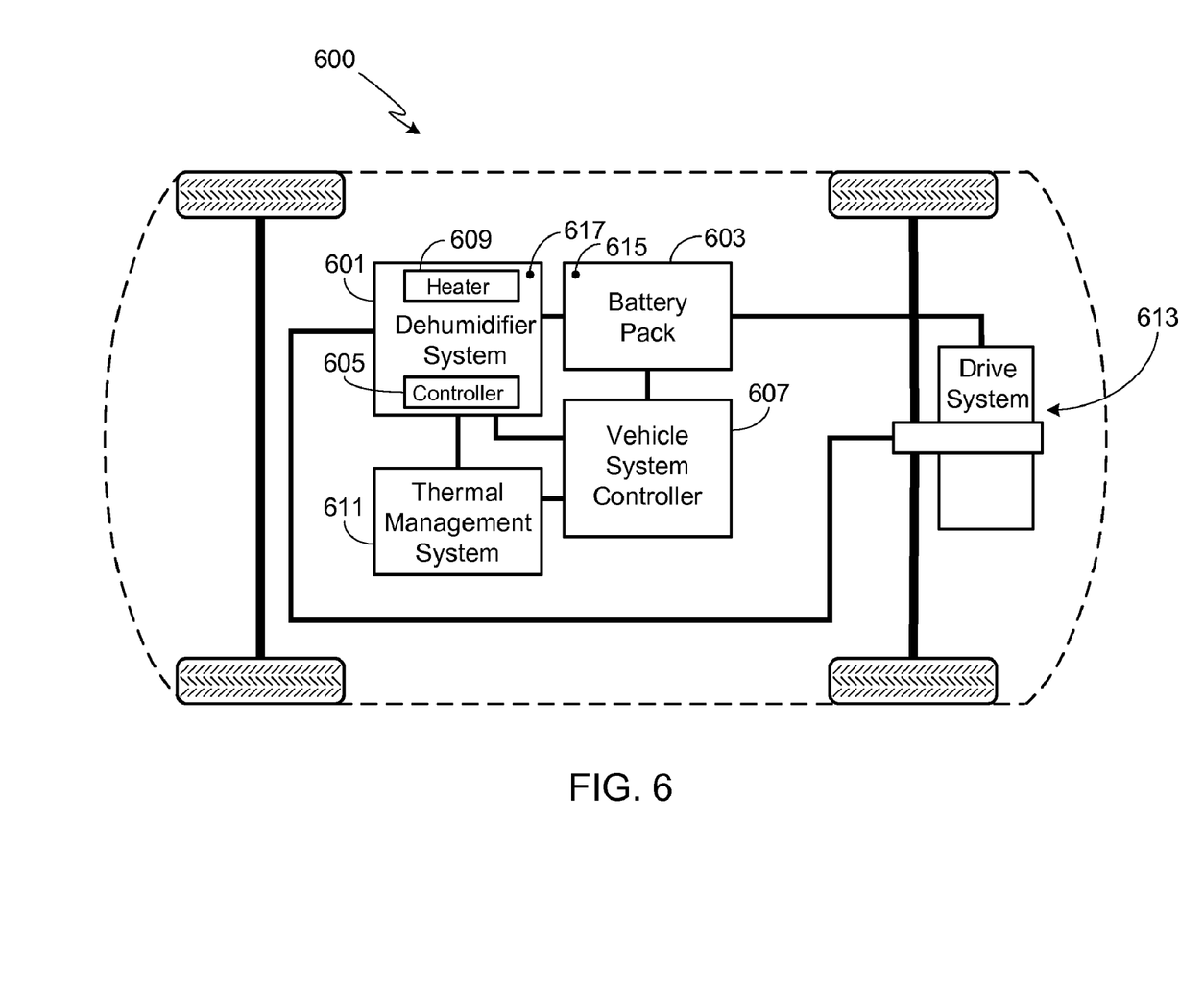
FIG. 6 provides a system level diagram of a dehumidifier system mounted within an electric vehicle.

There are a variety of techniques that may be used to heat and recondition the desiccant while preventing re-entry of water vapor into the battery pack. While these techniques and systems are described generally below, it will be appreciated that the specific configuration used for a particular application depends on a variety of factors. For example, in vehicle 600 shown in FIG. 6, desiccant-based dehumidifier 601 may either be integrated within battery pack 603 or be mounted externally to the battery pack but coupled to the pack such that air flow circulates between the pack's internal volume of air and the desiccant container. In at least one embodiment dehumidifier system 601 utilizes an internal controller 605 while in at least one alternate embodiment the dehumidifier system utilizes the vehicle control system 607, thus reducing manufacturing cost and overall vehicle complexity. The controller, either internal controller 605 or system controller 607, estimates when the desiccant-based dehumidifier begins to lose absorption/adsorption efficacy due to reaching its saturation level (i.e., its water handling capacity) at which point the controller activates a heating system to reactivate the desiccant. Determination of desiccant absorption/adsorption efficacy may be based on internal humidity levels, timing (e.g., time since the desiccant was placed into service or since the last reactivation process), or based on other criteria. Preferably dehumidifier system 601 utilizes a system dedicated heater 609 during the reactivation process, although in at least one alternate embodiment the dehumidifier system 601 utilizes the vehicle's thermal management system 611, while in yet another alternate embodiment the dehumidifier system 601 utilizes heat withdrawn from the drive train 613 (e.g., motor heat, transmission heat, etc.). Additionally, and as described in detail below, in at least one embodiment the system includes one or more humidity sensors, for example mounted within battery pack 603 (i.e., sensor 615) and/or mounted within the dehumidifier system (i.e., sensor 617), to gauge desiccant saturation.

FIGS. 7-11 illustrate exemplary heater configurations that may be used to heat and recondition the desiccant of the battery pack dehumidifier of the invention. It will be appreciated that while the illustrated configurations show the basic components used by each heater, there are numerous variations that may be used depending upon (i) the volume and configuration of the battery pack, (ii) the number of dehumidifier systems coupled to the pack, (iii) the type, volume and configuration of the desiccant used, and (iv) the expected humidity levels within the pack. In dehumidifier system 700, enclosure 701 containing desiccant 703 is coupled to the internal battery pack such that during normal operation airflow is freely permitted between the internal air volume of the battery pack and desiccant 703. As noted above, since the dehumidifier system may be mounted within, or external to, the battery pack, the system may use conduits, gratings, apertures, slits, etc. to provide means for allowing such airflow. Additionally, and also as noted above, one or more fans may be used to enhance air circulation. In the following figures, the coupling between the battery pack (e.g., pack 603) and the dehumidifier system is represented by conduits 705.

Figure 7:
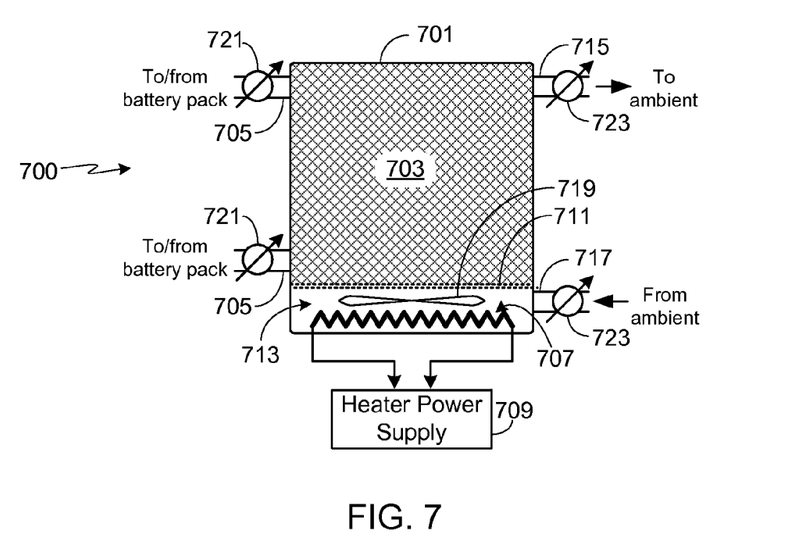
FIG. 7 illustrates an exemplary dehumidifier system in which the heater is mounted in close proximity to the desiccant.

In system 700, a heating element 707 is mounted in close proximity to desiccant 703. Heating element 707, shown coupled to a heater power source (e.g., battery) 709, is positioned close enough to desiccant 703 to heat the desiccant through a combination of radiation, conduction and convection. In at least one embodiment element 707 utilizes an electric resistive heating element (e.g., nickel-chromium wire heater). Note that in this configuration heating element 707 is held apart from desiccant 703 using a thermally conductive structure 711. In addition to being thermally conductive, preferably structure 711 utilizes a porous design that maximizes the transfer of heat from heater 707 to the desiccant 703, while preventing desiccant 703 from falling into the heater volume 713.

As water vapor evaporates from desiccant 703, it is expelled to the ambient environment through one or more conduits 715. Preferably the system also includes means, e.g., conduit(s) 717, for drawing fresh air into heater volume 713. In at least one embodiment, the system also includes means, represented by fan 719, for forcing the heated air through desiccant 703, thereby enhancing and expediting the removal of moisture from the desiccant. Note that fan 719 may be mounted within the entrance to the container, within the air input (e.g., conduit 717), and/or within the air exhaust (e.g., conduit 715) in order to pull air through desiccant 703.

As previously noted, it is important that the water that evaporates from the desiccant during the reactivation process is not permitted to re-enter the battery pack. Accordingly in at least one preferred embodiment during the reactivation process airflow between the battery pack and the desiccant container is prevented, for example by closing valves 721. Additionally and as noted above, preferably during the reactivation process airflow is permitted, at least to a limited extent, between the ambient environment and the desiccant in order to provide a means of exhausting the water vapor emitted by the heated desiccant. In the illustrated embodiment, ambient airflow is controlled using valves 723.

Figure 8:
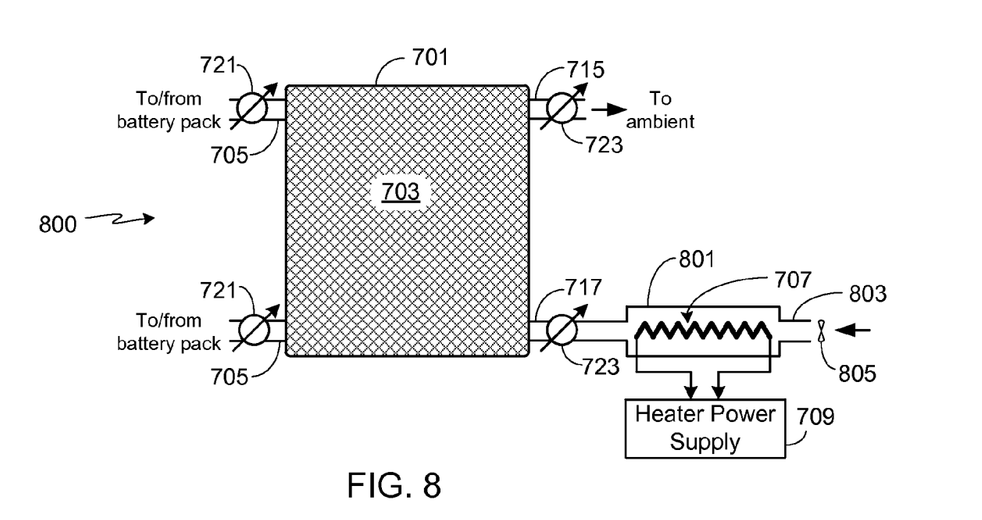
FIG. 8 illustrates an exemplary dehumidifier system in which the heater is mounted within a heating chamber separate from the desiccant chamber.

FIG. 8 illustrates a modification of the desiccant heating system. In system 800, rather than locating the heating element within desiccant container 701 and within a volume adjacent to desiccant 703, heating element 707 is mounting outside of desiccant container 701. Preferably in this configuration heating element 707 is mounting within a separate enclosure 801 that is coupled to desiccant container 701 via conduit 717 and to an ambient air intake 803. Ambient air, heated by heater 707, is forced to flow through desiccant 703 using one or more fans 805. The heated ambient air then dries desiccant 703, primarily through convection, with the water vapor being exhausted to the ambient environment through one or more conduits 715. It will be appreciated that heater chamber 801 may be mounted immediately adjacent to desiccant container 701 or mounted at some distance from container 701 as shown. As in system 700, preferably one or more valves, e.g., valves 721 and 723, are used to prevent water from desiccant 703 being reintroduced into the battery pack during desiccant reactivation and to provide a means for controlling the flow of ambient air into desiccant container 701.

Figure 9:
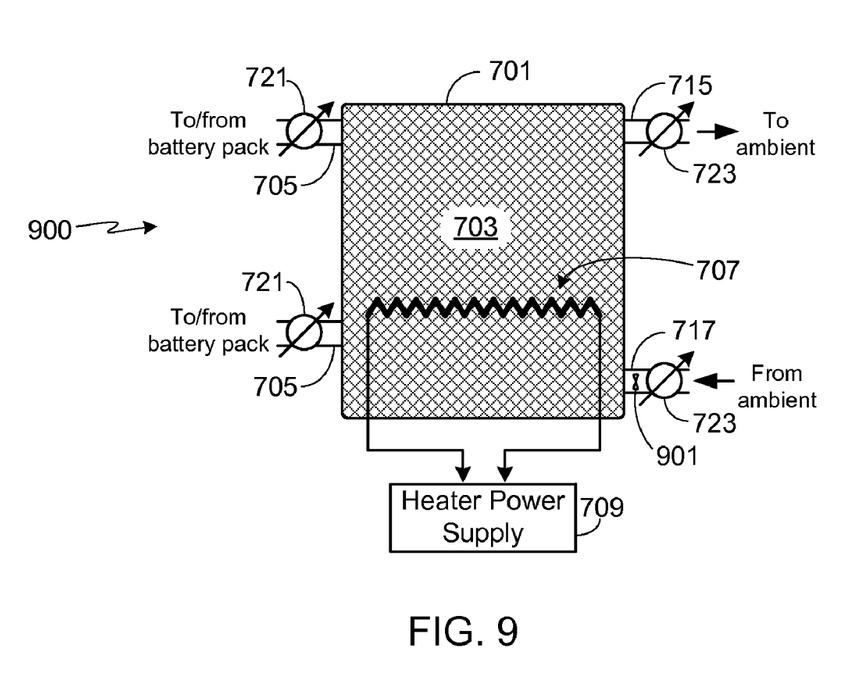
FIG. 9 illustrates an exemplary dehumidifier system in which the heater is mounted within the desiccant.

FIG. 9 illustrates another modification of the desiccant heating system. In system 900 heating element 707 is positioned within desiccant 703, thereby primarily drying out desiccant 703 via conduction. As in systems 700 and 800, outside ambient air is drawn through the system, e.g., flowing into the desiccant container through one or more conduits 717 and flowing out of the desiccant container through one or more conduits 715, in order to exhaust the water vapor rejected by the desiccant outside of the battery pack. Also as in systems 700 and 800, preferably valves are used to control the flow of air between desiccant container 701 and either the battery pack or the ambient environment, depending upon whether the desiccant in container 701 is being used to absorb water vapor from the battery pack or the water vapor is being driven out of the desiccant during the desiccant reactivation process. Note that system 900 preferably includes one or more fans 901 to drive ambient air through the desiccant during the heating and reactivation process, thereby enhancing the drying out process.

In general, desiccant 703 performs best when it is spread into a relatively thin layer, e.g., preferably with a layer thickness of less than 1 inch, and even more preferably with a layer thickness of less than 0.5 inches. While thicker layers of desiccant are still capable of absorbing water vapor, absorption efficiency drops off due to the longer pathway required for the water vapor to reach all regions of the thick desiccant layer. Fortunately for a low water content application, such as a battery pack, water absorbed/adsorbed in the outermost desiccant layers is gradually transferred to the underlying layers, thus providing adequate absorption/adsorption even in very thick desiccant layers (e.g., 3-5 inch thick layers).

While thick layers of desiccant may be used to absorb/adsorb water vapor from a battery pack, the inventors have found that the reactivation of thick desiccant layers is difficult with a simple heater configuration such as those shown above in FIGS. 7-9. While part of the difficulty arises due to the need to reactivate the desiccant in a timely manner, the primary issue is one of reaching a relatively uniform temperature within container 701, that temperature being great enough to reactivate the desiccant. Given the low thermal conductivity of a typical desiccant, heat applied to one region of the desiccant does not adequately heat other regions, especially for large layer thicknesses. If adequate heat is not applied throughout container 701, water vapor is merely driven from one region of desiccant to another. Inadequate desiccant heating is especially problematic if chamber 701 is open to the ambient environment during the reactivation process, as this would allow even more water vapor to be absorbed by the desiccant. Accordingly, if the thickness of the desiccant layer contained within chamber 701 is very large, preferably a heater configuration is used that adequately heats the entire volume of desiccant to a temperature great enough to reactivate the desiccant. It will be appreciated that for very large desiccant containers with large volumes of desiccant, there may be small regions within the container that are allowed to remain below the desired reactivation temperature. In general, however, at least 75% of the desiccant is raised above the reactivation temperature, more preferably at least 80% of the desiccant is raised above the reactivation temperature, and still more preferably at least 90%-95% of the desiccant is raised above the reactivation temperature. It should be understood that the point at which an alternate heater configuration is required in order to heat the entire volume of desiccant depends upon a number of factors, including the type of desiccant, desiccant bead/grain size, packing density of the desiccant within container 701, volume and configuration of the container, air flow through the desiccant during drying, required reactivation temperature, ambient temperature, etc. In general, however, the inventors have found that a heater configuration that is able to uniformly heat the entire volume of desiccant is required when the desiccant layer thickness is greater than 0.25 inches; alternately, greater than 0.5 inches; alternately, greater than 0.75 inches; alternately, greater than 1.0 inches.

Figure 10:
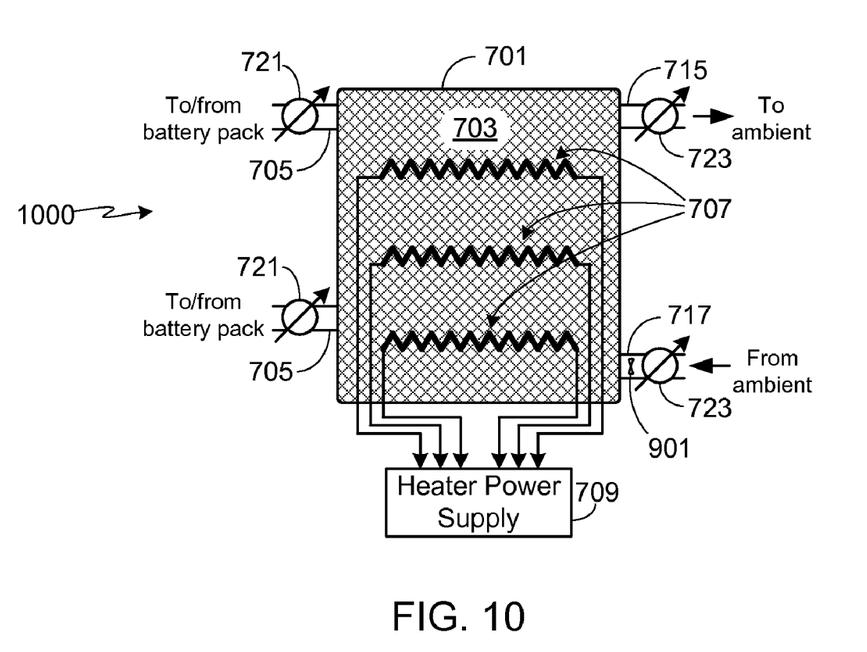
FIG. 10 illustrates a modification of the dehumidifier system shown in FIG. 9 in which multiple heating elements are mounted within the desiccant.

FIG. 10 illustrates a modification of the system shown in FIG. 9 that is configured to achieve greater heating uniformity throughout the volume of desiccant 701. As shown, system 1001 includes multiple heating elements 707 that are located throughout the volume of desiccant, thereby providing more uniform heating of the desiccant.

Figure 11:
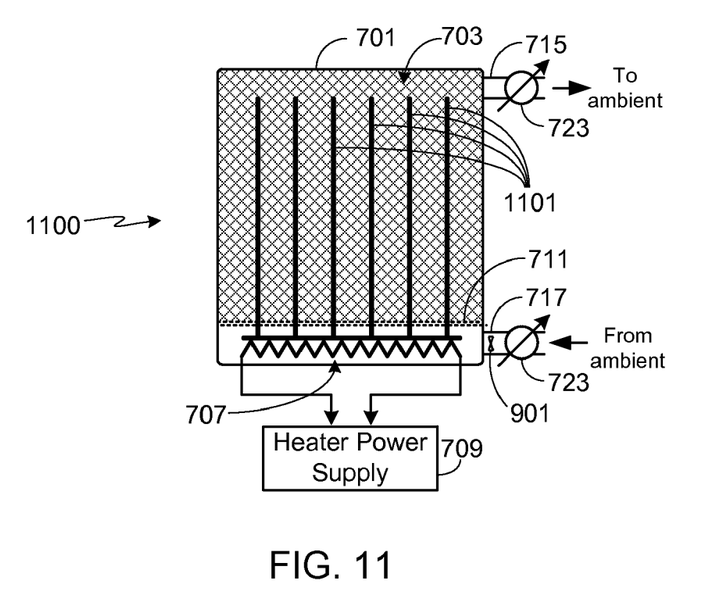
FIG. 11 illustrates an exemplary dehumidifier system in which thermally conductive fins are used to achieve more uniform heating of the desiccant.
Figure 12:
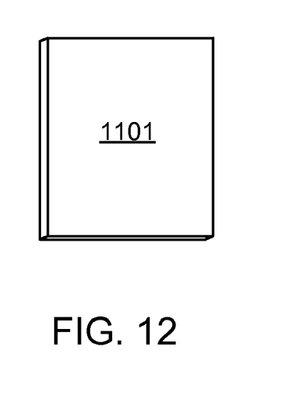
FIG. 12 illustrates an exemplary fin for use in a system such as that shown in FIG. 11.
Figure 13:
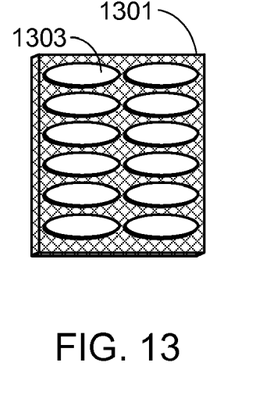
FIG. 13 illustrates an exemplary fin that includes a plurality of apertures for use in a system such as that shown in FIG. 11.
Figure 14:
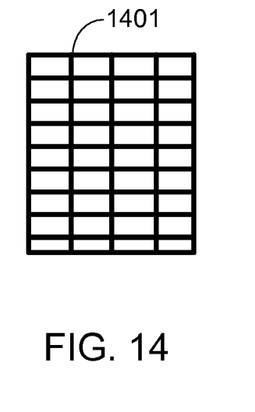
FIG. 14 illustrates a crisscross pattern of thermal conductors for use in a system such as that shown in FIG. 11.

FIG. 11 illustrates an alternate approach to uniformly heating the desiccant, system 1100 utilizing a single heater 707. In system 1100, however, the heat from heater 707 is transferred throughout the desiccant via a plurality of thermally conductive structures 1101 that are thermally coupled to heater 707. Preferably structures 1101 are fabricated from copper, although other thermally conductive materials (e.g., aluminum) may be used. In addition to having a high thermal conductivity, structures 1101 are designed to minimize their impact on air flow through the desiccant container, thus allowing the desiccant to still efficiently remove water vapor from the battery pack. It will be appreciated that the exact configuration for structures 1101 depend upon a variety of factors including the direction of airflow during normal use, the configuration of the system used to force air through the desiccant during normal use and/or desiccant reactivation, the volume of desiccant to be heated, the size of the desiccant chamber, and whether the desiccant chamber is located inside or outside of the battery pack. In the embodiment illustrated in FIG. 11, heat transfer structures 1101 are comprised of fins. As such, preferably the flow of air between the desiccant chamber and the battery pack is normal to the figure. Exemplary configurations for structures 1101 include fins (FIGS. 11-12); porous plates, i.e., flat elements 1301 that include a plurality of apertures 1303 (FIG. 13); and a crisscross pattern of thermally conductive elements 1401 (FIG. 14).

The system of the invention can use several different techniques to determine when to reactivate the desiccant using the disclosed heating system. In the technique illustrated in FIG. 15, after the system is initialized (e.g., first put into service) (step 1501), a system timer is also initialized (step 1503). As long as the time since initialization is less than a preset time period (step 1505), it is assumed that the moisture handling capacity of the desiccant is within the desired range. Once the time since initialization exceeds the preset time period (step 1507), the system controller (e.g., 605 or 607) activates the desiccant reactivation system. While the steps associated with the reactivation system may vary depending upon the exact configuration of the dehumidifier system as noted above, in at least one embodiment during desiccant reactivation the airflow between the dehumidifier system and the battery pack is closed (step 1509), the heating system is activated (step 1511), and ambient air is forced through the desiccant (step 1513). After a preset period of time has expired (step 1515), the flow of ambient air is terminated (step 1517), the heater is turned off (step 1519), and the airflow between the dehumidifier system and the battery pack is opened (step 1521). At this point the system is re-initialized (step 1523) and the system re-enters normal operation.

Figure 15:
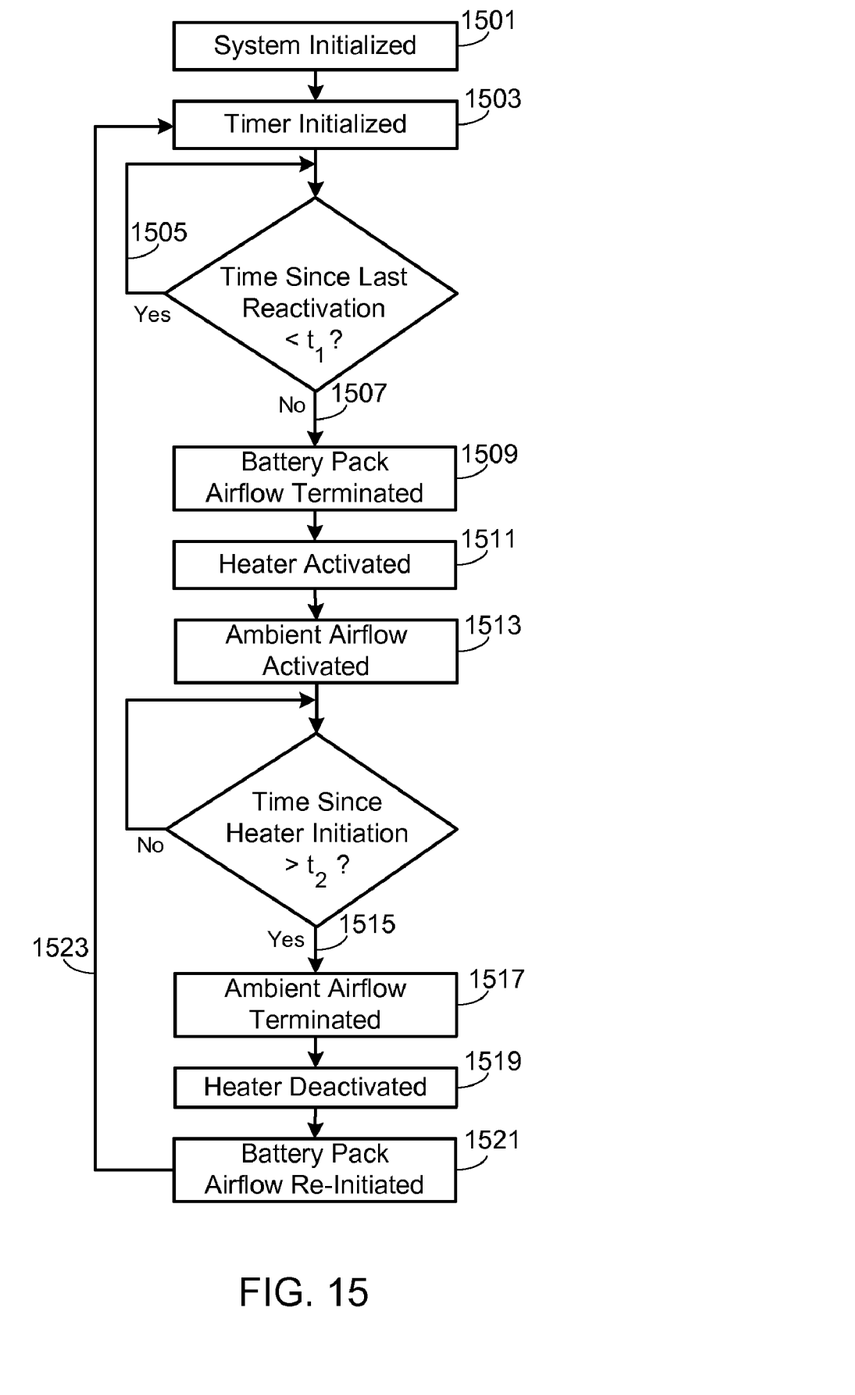
FIG. 15 illustrates a process for determining when to activate the desiccant reactivation system of the invention based on timing.
Figure 16:
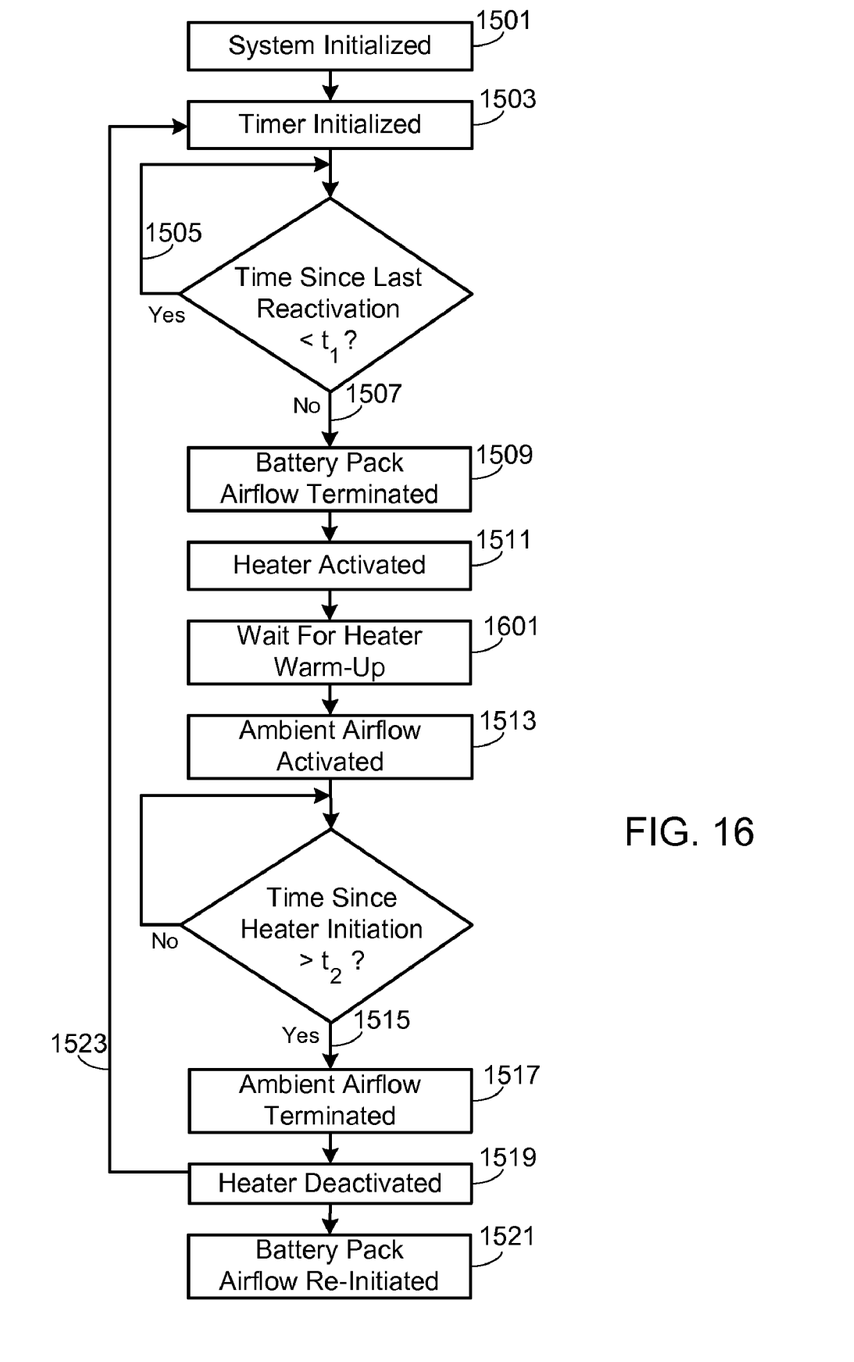
FIG. 16 illustrates a modified process based on the procedure of FIG. 15.

FIG. 16 illustrates a minor modification of the process shown in FIG. 15. As shown, after the heating system is activated (step 1511), the system waits for a preset time period (step 1601) to allow heater warm-up prior to opening the desiccant container to ambient airflow.

Figure 17:
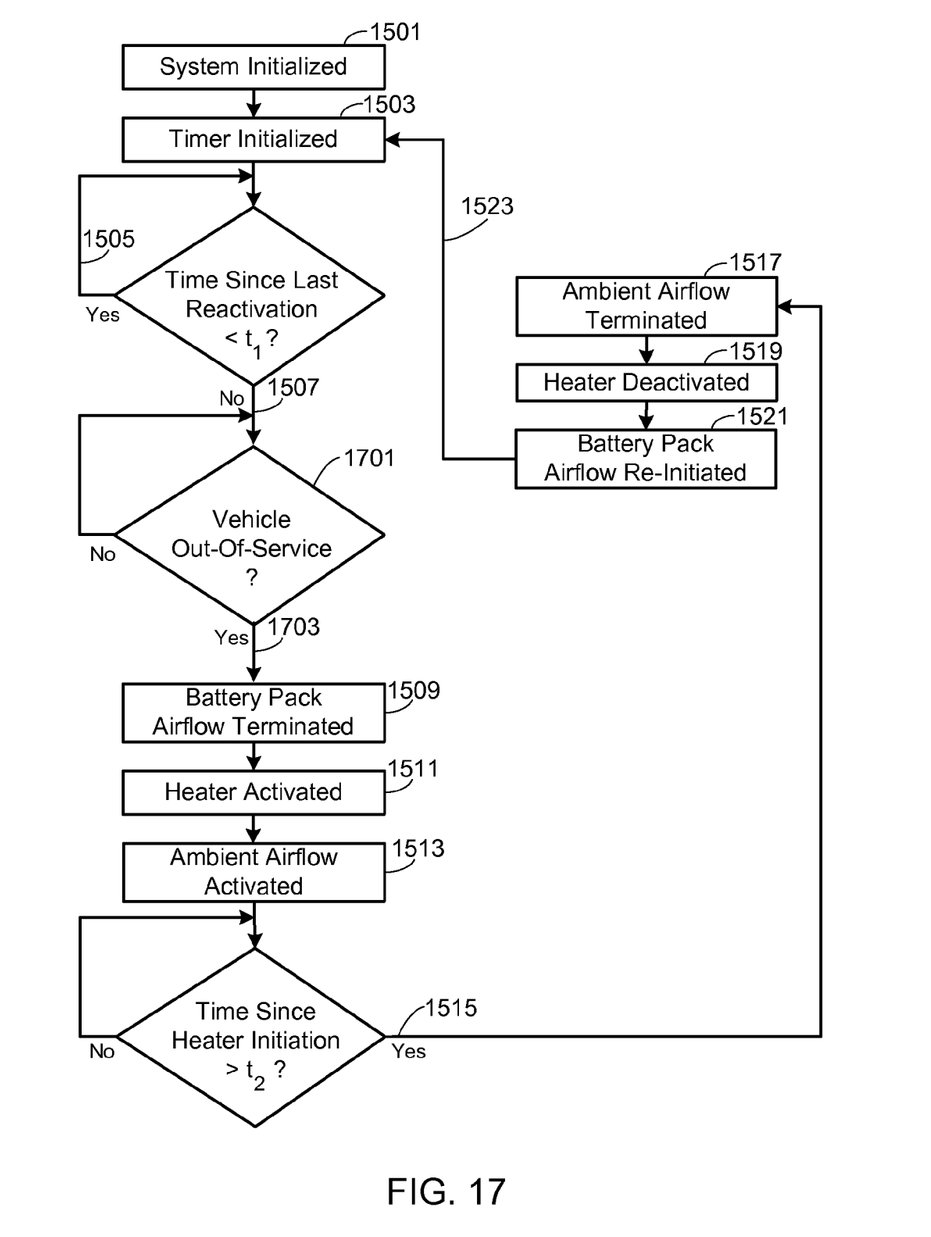
FIG. 17 illustrates a modified process based on the procedure of FIG. 15 in which desiccant reactivation is performed during a vehicle out-of-service period.

In the process illustrated in FIG. 17, once the system determines that the time since the last reactivation has exceeded the preset time period (i.e., $t_1$ in FIG. 17) the system starts monitoring for the next time period in which the vehicle is out-of-service (step 1701). The system can be set-up to associate the vehicle being out-of-service with various criteria. For example, in one configuration an out-of-service vehicle corresponds to the vehicle being parked and/or in the 'off' state (e.g., driver not in the driver's seat; key/key fob not in proximity to the vehicle; etc.). In another configuration an out-of service vehicle corresponds to a preset time of day (e.g., 3 AM). In yet another configuration an out-of-service vehicle corresponds to the battery pack being coupled to a charging system and an external power source. Once the system controller determines that the vehicle is out-of-service (step 1703), the desiccant reactivation process is initiated as described relative to either FIG. 15 or FIG. 16.

Figure 18:
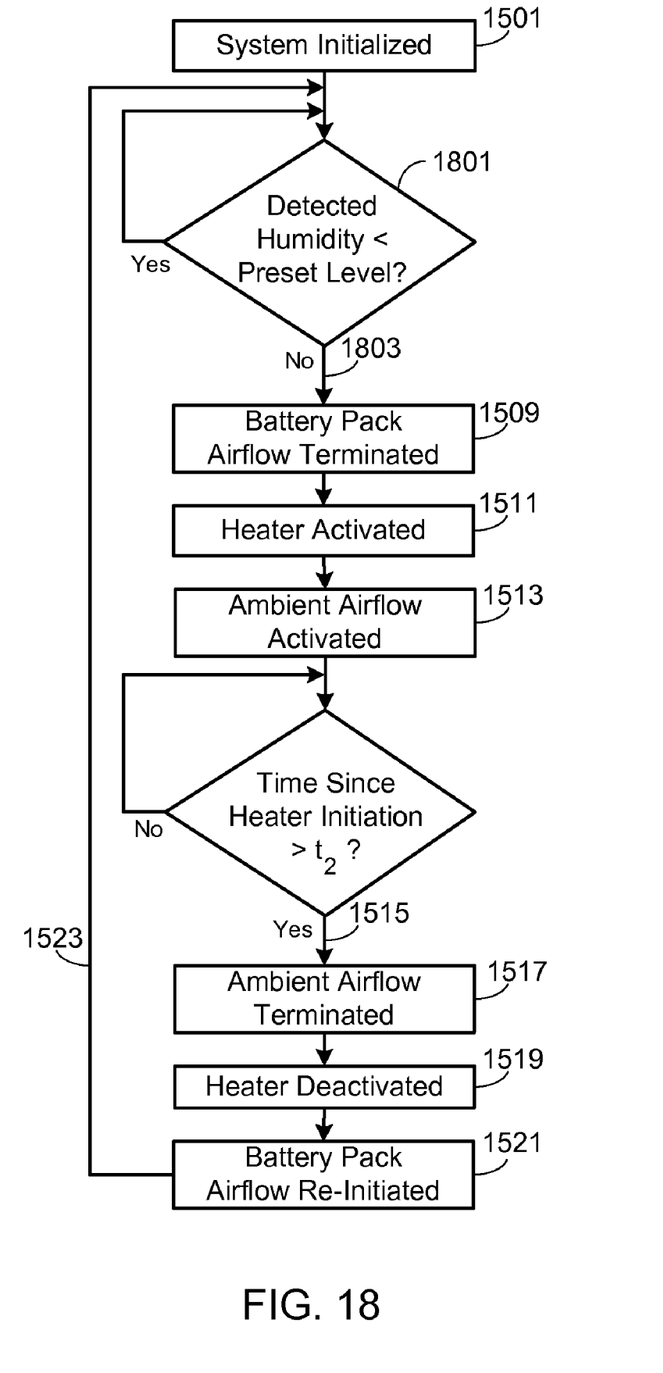
FIG. 18 illustrates a process for determining when to activate the desiccant reactivation system of the invention based on monitored humidity.
Figure 19:
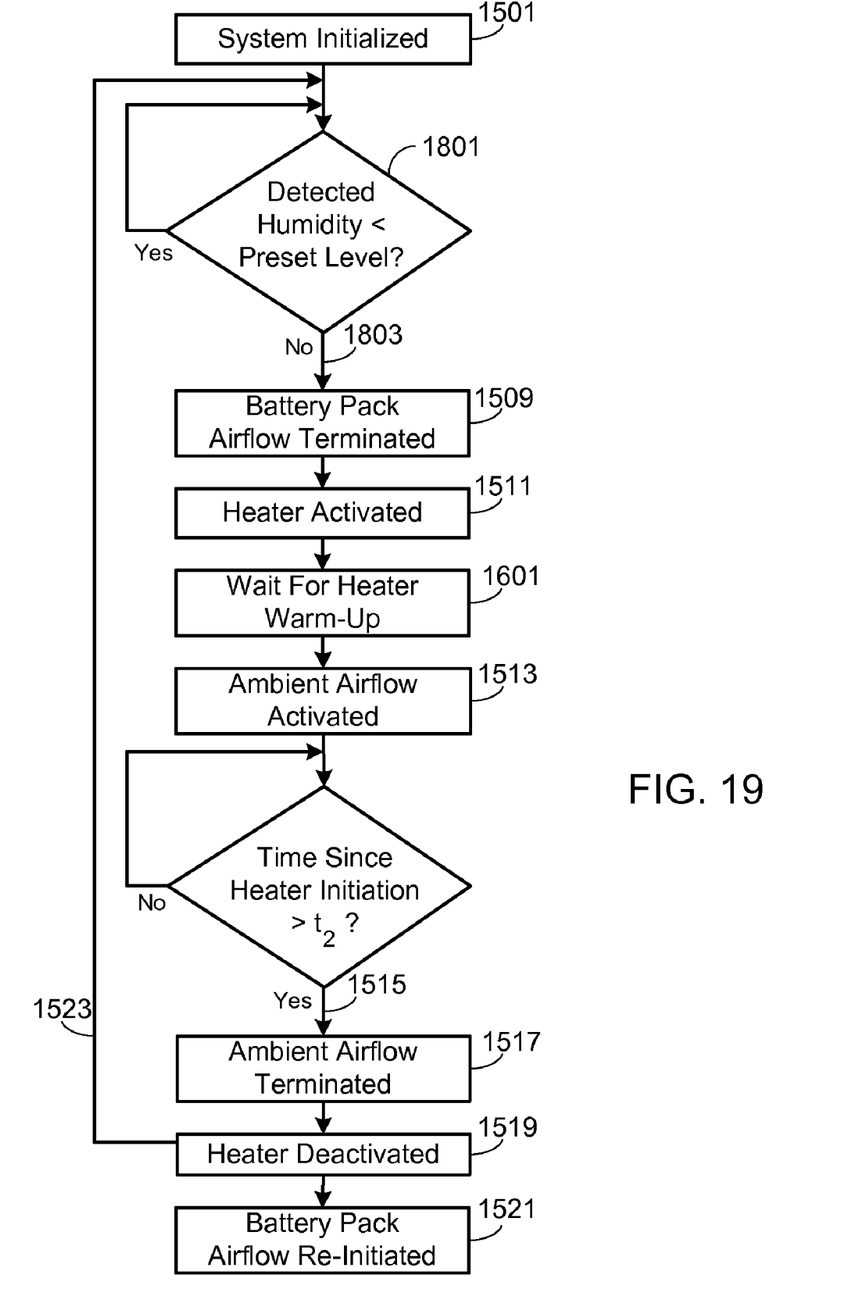
FIG. 19 illustrates a modified process based on the procedure of FIG. 18.
Figure 20:
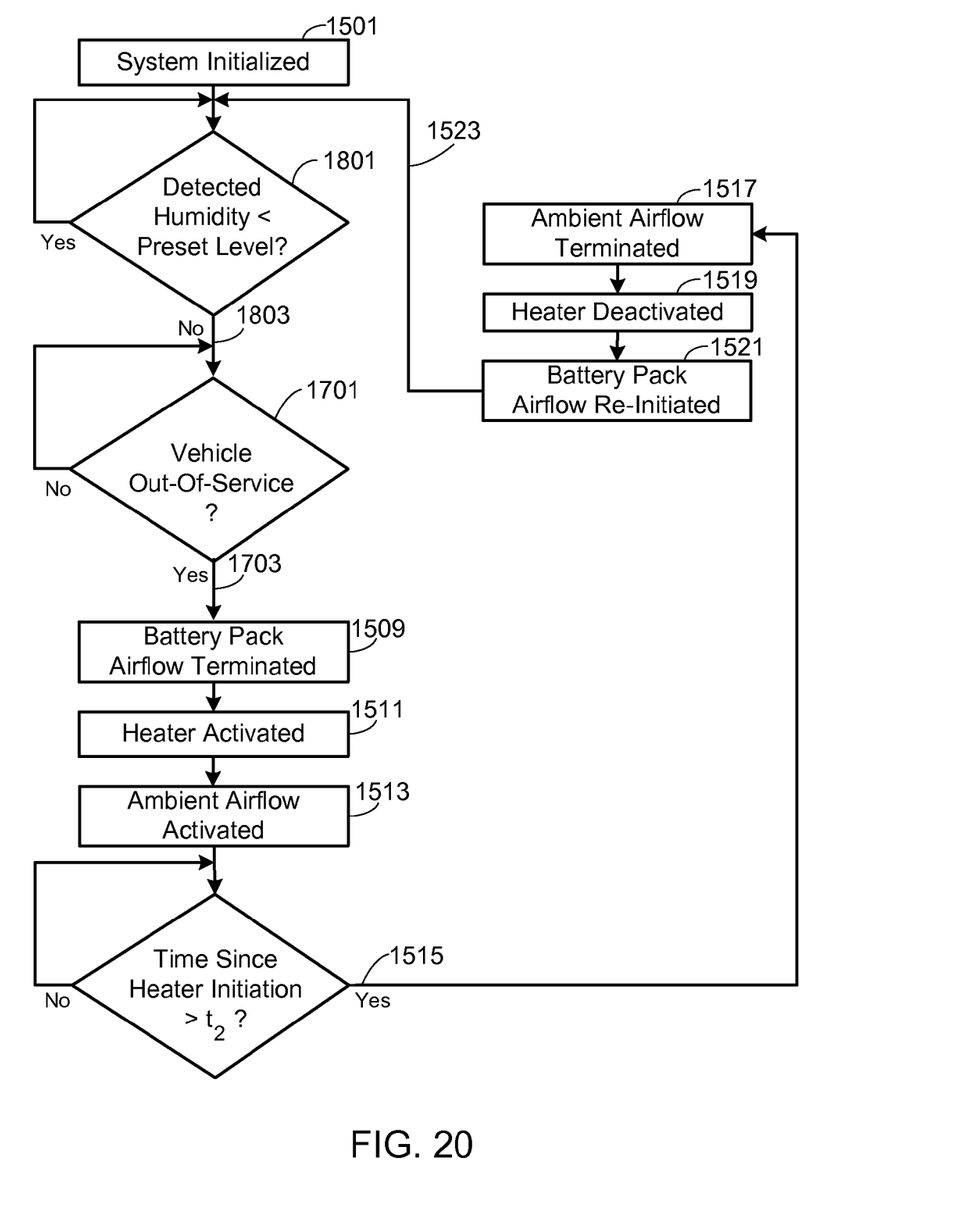
FIG. 20 illustrates a modified process based on the procedure of FIG. 18 in which desiccant reactivation is performed during a vehicle out-of-service period.

It will be appreciated that initiation of the desiccant reactivation system of the present invention may be based on other criteria than the time since the last reactivation. For example, the humidity corresponding to a region of the battery pack and/or a region of the desiccant container may be monitored and used to determine when the desiccant has become saturated and desiccant reactivation is required. This approach is illustrated in FIGS. 18-20 which correspond to FIGS. 15-17 with the exception that instead of monitoring time, these embodiments monitor humidity (step 1801) and only activate the desiccant reactivation system when the detected humidity exceeds a preset level (step 1803).

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A method of controlling battery pack humidity, the method comprising the steps of:
providing a first air passageway between a battery pack enclosure and a desiccant enclosure, wherein said battery pack enclosure is configured to hold a plurality of batteries and said desiccant enclosure is configured to contain a volume of desiccant;
providing a second air passageway between said desiccant enclosure and a volume of air external to said battery pack enclosure and external to said desiccant enclosure;
removing water vapor from said battery pack enclosure, wherein said water vapor is absorbed and adsorbed by said volume of desiccant;
determining if said volume of desiccant has lost absorption/adsorption efficacy;
outputting a first heater control signal when it is determined that said volume of desiccant has lost absorption/adsorption efficacy;
closing said first air passageway and opening said second air passageway after receipt of said first heater control signal;
heating said volume of desiccant in situ within said desiccant enclosure upon receipt of said first heater control signal, wherein said step of heating said volume of desiccant further comprises the step of reactivating said volume of desiccant;
outputting a second heater control signal after a preset period of time has passed since initiation of said step of heating said volume of desiccant;
opening said first air passageway and closing said second air passageway after receipt of said second heater control signal; and
terminating said heating step upon receipt of said second heater control signal.

2. The method of claim 1, the method further comprising the step of actively circulating air through said first air passageway and between said battery pack enclosure and said desiccant enclosure while performing said steps of removing said water vapor from said battery pack enclosure and absorbing and adsorbing said water vapor by said volume of desiccant.

3. The method of claim 1, the method further comprising the step of actively circulating air through said second air passageway and between said desiccant enclosure and said volume of air while performing said steps of heating said volume of desiccant and reactivating said volume of desiccant.

4. The method of claim 1, the method further comprising the step of opening said first air passageway and closing said second air passageway prior to receipt of said first heater control signal and upon receipt of a system initialization signal.

5. The method of claim 1, wherein said step of opening said second air passageway is delayed for a predetermined period of time after receipt of said first heater control signal.

6. The method of claim 1, wherein said step of determining if said volume of desiccant has lost absorption/adsorption efficacy further comprises the steps of:
determining elapsed time since receipt of a system initialization signal;
comparing said elapsed time to a preset time period; and
outputting said first heater control signal when said elapsed time exceeds said preset time period.

7. The method of claim 6, wherein after performing said step of outputting said first heater control signal, said method further comprises the step of recording a new system initialization signal.

8. The method of claim 6, wherein after performing said step of outputting said second heater control signal, said method further comprises the step of recording a new system initialization signal.

9. The method of claim 1, wherein said step of determining if said volume of desiccant has lost absorption/adsorption efficacy further comprises the steps of:
monitoring humidity within said battery pack enclosure;
comparing said humidity to a preset humidity level; and outputting said first heater control signal when said humidity exceeds said preset humidity level.

10. The method of claim 1, wherein said step of determining if said volume of desiccant has lost absorption/adsorption efficacy further comprises the steps of:
   monitoring humidity within said desiccant enclosure;
   comparing said humidity to a preset humidity level; and
   outputting said first heater control signal when said humidity exceeds said preset humidity level.

11. The method of claim 1, wherein after said step of outputting said first heater control signal and prior to performing said step of heating said volume of desiccant the method further comprises the steps of:
   determining if an electric vehicle containing said battery pack is in-service or out-of-service;
   performing said step of heating said volume of desiccant if said electric vehicle is out-of-service; and
   delaying said step of heating said volume of desiccant if said electric vehicle is in-service, wherein said delaying step is performed until said electric vehicle is out-of-service.

12. The method of claim 11, further comprising the step of determining if said electric vehicle is parked, wherein said electric vehicle is out-of-service if said electric vehicle is parked.

13. The method of claim 11, further comprising the step of determining if said battery pack is coupled to a charging system and a charging source, wherein said electric vehicle is out-of-service if said battery pack is coupled to said charging system and said charging source.

14. The method of claim 11, further comprising the steps of determining a time of day and determining if said time of day is within a preset time range, wherein said electric vehicle is out-of-service if said time of day is within said preset time range.

15. The method of claim 1, wherein said step of heating said volume of desiccant in situ within said desiccant enclosure further comprises the steps of:
   activating a heating element located in an air heating chamber within said desiccant enclosure, wherein said heating chamber is separate from a desiccant chamber containing said volume of desiccant; and
   circulating heated air from said air heating chamber through said desiccant chamber.

16. The method of claim 15, further comprising the step of positioning a plurality of thermally conductive structures throughout said desiccant chamber, wherein said step of heating said volume of desiccant in situ further comprises the steps of heating said plurality of thermally conductive structures with said heating element, wherein said plurality of thermally conductive structures transfer heat from said heating element to said volume of desiccant.

17. The method of claim 1, wherein said step of heating said volume of desiccant in situ within said desiccant enclosure further comprises the step of activating a heating element located within said volume of desiccant within said desiccant enclosure.

18. The method of claim 17, wherein said step of heating said volume of desiccant further comprises the step of circulating air throughout said desiccant enclosure.

19. The method of claim 17, further comprising the step of positioning a plurality of thermally conductive structures throughout said desiccant chamber, wherein said step of heating said volume of desiccant in situ further comprises the steps of heating said plurality of thermally conductive structures with said heating element, wherein said plurality of thermally conductive structures transfer heat from said heating element to said volume of desiccant.

20. The method of claim 1, wherein said step of heating said volume of desiccant in situ within said desiccant enclosure further comprises the steps of:
   activating a heating element located in an air heating chamber separate and remote from said desiccant enclosure; and
   circulating heated air from said air heating chamber through said desiccant enclosure.

* * * * *